United States Patent
Simmons et al.

(10) Patent No.: US 6,651,693 B2
(45) Date of Patent: Nov. 25, 2003

(54) CHECK VALVE

(76) Inventors: John M. Simmons, 5650 N. Smith Rd., Henderson, MI (US) 48841; Tom M. Simmons, 3670 Raucholz Rd., Hemlock, MI (US) 48626; David M. Simmons, 15010 Frost Rd., Hemlock, MI (US) 48626

( * ) Notice: Subject to any disclaimer, the term of this patent is extended or adjusted under 35 U.S.C. 154(b) by 0 days.

(21) Appl. No.: 10/191,099

(22) Filed: Jul. 9, 2002

(65) Prior Publication Data

US 2003/0024571 A1 Feb. 6, 2003

Related U.S. Application Data

(60) Provisional application No. 60/304,675, filed on Jul. 11, 2001.

(51) Int. Cl.[7] .......................... F16K 15/04; F16K 25/00
(52) U.S. Cl. ............................. 137/329.05; 137/516.27; 251/334; 251/359
(58) Field of Search ..................... 137/329.05, 516.27, 137/516.29; 251/334, 359, 360

(56) References Cited

U.S. PATENT DOCUMENTS

| | | | | | |
|---|---|---|---|---|---|
| 1,671,140 | A | * | 5/1928 | Wilson | 251/334 |
| 1,679,779 | A | * | 8/1928 | Oberhuber | 251/334 |
| 1,699,217 | A | * | 1/1929 | Wilson | 251/334 |
| 2,676,782 | A | * | 4/1954 | Bostock | 137/516.29 |
| 3,054,422 | A | * | 9/1962 | Napolitano | 251/334 |
| 3,091,254 | A | * | 5/1963 | Kilayko | 137/516.29 |

(List continued on next page.)

FOREIGN PATENT DOCUMENTS

| | | | | | |
|---|---|---|---|---|---|
| FR | 2385016 | * | 11/1978 | | 251/334 |
| GB | 1219506 | * | 1/1971 | | 137/516.27 |

Primary Examiner—George L. Walton

(57) ABSTRACT

The check valve (12, 14) of the present invention is a ball-type valve that incorporates multiple annular valve seats (34, 38) of progressively smaller diameters for the specific purpose of providing a series of effective annular valve seats as the larger annular valve seats progressively deteriorate, and as the ball valve elements (24) wear away (decrease in diameter) from use, for example, as abrasive slurry is pumped through the check valves and through the fluid pump. Each of the annular valve seats (34, 38) comprises a flexible or otherwise deformable annular lip defined by a cylindrical section having an annular groove (36, 40) formed therein slightly outboard of the cylindrical section, such that the cylindrical section may deform slightly outwardly into the annular groove, thereby effecting an improved functional sealing engagement with the ball valve element (24) as the tip of the cylindrical section deforms outwardly into the annular groove.

As abrasive slurry material is pumped through the fluid pump and through the check valve, the first annular valve seat (34) defined by the cylindrical section and first surrounding annular groove (36) deteriorates and the ball valve element wears away from the flow of abrasive slurry, causing the first annular valve seat to erode away and the ball valve element (24) to wear down (decrease in diameter). The first annular valve seat slowly deteriorates, and therefore increases in diameter, and the ball valve element slowly wears away, decreasing in diameter, to the point where they become no longer effective as a fluid seal. The worn ball valve element then engages a second annular valve seat (38), of the same configuration as the first annular valve seat (34), only necessarily of a smaller diameter than that of the first annular valve seat, and effects a seal therebetween. The combination of the increase in diameter of the first annular valve seat (34) and decrease in diameter in the ball valve element (24) permits the ball valve element to drop further toward the second annular valve seat (38), thereby causing the ball valve element to engage the second annular valve seat.

12 Claims, 6 Drawing Sheets

U.S. PATENT DOCUMENTS

| | | | | |
|---|---|---|---|---|
| 3,185,438 A | * | 5/1965 | Smirra | 251/334 |
| 3,346,008 A | * | 10/1967 | Scaramucci | 137/516.29 |
| 3,620,653 A | * | 11/1971 | Gaylord et al. | 137/516.29 |
| 3,906,986 A | * | 9/1975 | Zurit et al. | 137/516.29 |
| 4,474,208 A | * | 10/1984 | Looney | 137/516.29 |
| 4,781,213 A | * | 11/1988 | Kilayko | 137/516.27 |
| 5,893,389 A | * | 4/1999 | Cunningham | 137/516.27 |
| 6,105,610 A | * | 8/2000 | Watkins, II et al. | 137/516.29 |
| 6,109,295 A | * | 8/2000 | Santana | 137/516.29 |

* cited by examiner

CHECK VALVE

CROSS-REFERENCE TO RELATED APPLICATIONS

This application claims the priority benefit of 35 USC § 119 of U.S. provisional application Ser. No. 60/304,675, filed Jul. 11, 2001, entitled Check Valve, hereby incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention relates to a reciprocating fluid pump, and more particularly relates to a check valve for use in a reciprocating fluid pump, and even more particularly relates to such a reciprocating fluid pump check valve used in an abrasive environment, for instance, a slurry pump.

2. Description of the Prior Art

Reciprocating fluid pumps are well known in the fluid industry. Many such pumps are categorized as reciprocating diaphragm, piston, bellows, etc. type, such pumps comprising a pair of opposed diaphragms, etc. fixed to opposite ends of a drive shaft that reciprocates the opposed diaphragms, etc. within respective pumping cavities to effect pumping of the fluid. Typically, such a fluid pump is actuated by pneumatic (air) pressure acting on one surface of the diaphragm, the opposite surface of the diaphragm exposed to the pumped fluid. Each diaphragm is positioned within a respective pumping cavity such that the diaphragm divides the cavity into a pneumatic chamber and a pumped-fluid chamber. The pumped-fluid chamber includes a first check valve at the "fluid-in" section of the pump and a second check valve at the "fluid-out" section of the pump. These check valves operate to ensure that fluid flows in only one direction, i.e., in the fluid-in section of the pump and out the fluid-out section of the pump.

Check valves can be typically flapper valves or ball valves. Ball-type check valves typically have a circular valve seat at one end of a more-or-less cylindrical ball chamber to which the ball valve element seats (seals) to prevent flow in the reverse direction (back-flow) through the check valve. The opposite end of the cylindrical ball chamber has no valve seat, but rather is designed to support the ball valve element away from the end of the chamber in order to permit fluid flow around the ball valve element and through the check valve in the forward direction.

Ball-type check valves have various mechanisms for seating the ball valve element against the valve seat. Typical of these are (1) a spring that urges the ball valve element toward the valve seat, (2) gravity that urges the ball valve element downwardly toward the valve seat, (3) the ball valve element being constructed of a lesser density material than that of the fluid through the check valve so that upward flow of fluid through the valve "floats" the ball valve element against the valve seat, etc.

SUMMARY OF THE INVENTION

The check valve of the present invention is a ball-type valve that incorporates multiple annular valve seats of progressively smaller diameters for the specific purpose of providing a series of effective valve seats as the larger annular valve seats progressively deteriorate, and as the ball valve element wears away (decreases in diameter) from use, for example, as abrasive slurry material is pumped through the check valves and through the fluid pump. Each of the annular valve seats (34, 38) comprises a flexible or otherwise deformable annular lip defined by a cylindrical section having an annular groove (36, 40) formed therein slightly outboard of the cylindrical section, such that the cylindrical section may deform slightly outwardly into the annular groove, thereby effecting an improved functional sealing engagement with the ball valve element as the tip of the cylindrical section deforms outwardly into the annular groove.

As abrasive slurry material is pumped through the fluid pump and through the check valve, the first annular valve seat (34) defined by the first cylindrical section and surrounding first annular groove (36) deteriorates and the ball valve element (24) wears away, due to the flow of abrasive slurry through the check valve, causing the first annular valve seat to erode away and causing the ball valve element to wear down (decrease in diameter). The first annular valve seat slowly deteriorates, and therefore increases in diameter, and the ball valve element slowly wears away, decreasing in diameter, to the point where they become no longer effective as a fluid seal. The worn ball valve element then engages a second annular valve seat (38), of the same configuration as the first annular valve seat (34), only necessarily of a smaller diameter than that of the first annular valve seat, and effects a seal therebetween. The combination of the increase in diameter of the first annular valve seat (34) and decrease in diameter in the ball valve element (24) permits the ball valve element to drop further toward the second annular valve seat (38), thereby causing the ball valve element to engage the second annular valve seat. The second annular valve seat (38) is spaced apart from the first annular valve seat (34) a distance to permit the second valve seat to seal with the ball valve element upon the occurrence of the first valve seat wearing and deforming a sufficient and pre-determined amount.

The process then repeats itself. Specifically, the second annular valve seat (38) is identical to but smaller than the first annular valve seat (34), comprising a cylindrical section defined by a second annular groove (40) immediately outboard of the cylindrical section, such that the tip of the cylindrical section is permitted to deform outwardly as it is engaged by the ball valve element, thereby creating the seal against the ball valve element and second annular valve seat. As the abrasive slurry material is pumped through the fluid pump and through the check valve, the second annular valve seat defined by the second cylindrical section and surrounding annular groove deteriorates and the ball valve element continues to further wear away from the flow of abrasive slurry, causing the second annular valve seat to erode away and the ball valve element to further wear down. The second annular valve seat slowly deteriorates, and therefore increases in diameter, and the ball valve element further wears away, further decreasing in diameter, to the point where they become no longer effective as a fluid seal. The worn ball valve element then engages a third annular valve seat (not shown in the drawings), of the same configuration as the first and second annular valve seat, thereby causing the ball valve element to engage the third annular valve seat as the second annular valve seat and ball valve element continue to deteriorate.

DETAILED DESCRIPTION OF THE INVENTION

Figure 1:
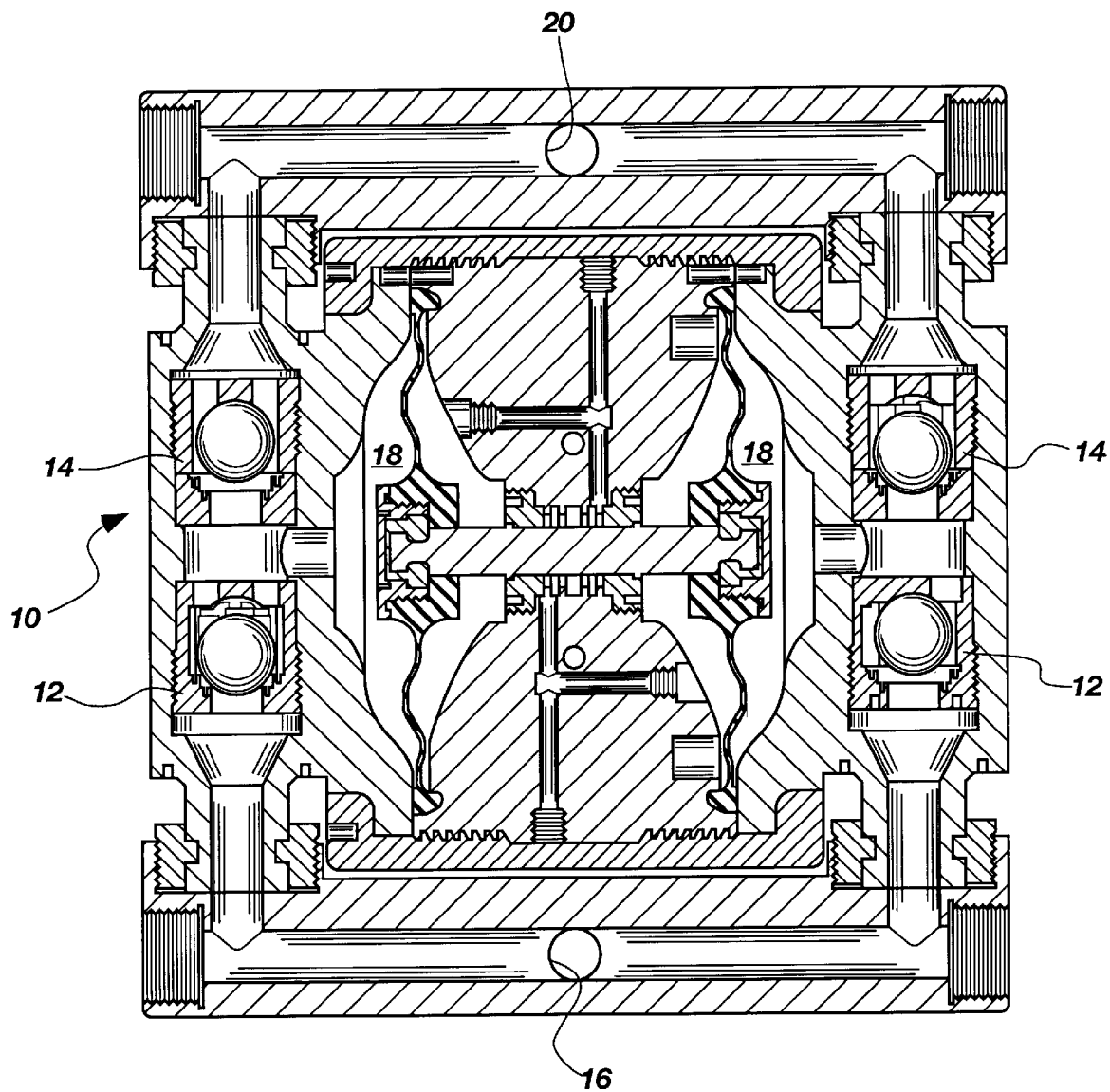
FIG. 1 is a schematic drawing of a dual-diagram pneumatically shifted reciprocating fluid pump, illustrating inlet (bottom) and outlet (top) check valves for each diaphragm pumping chamber (right and left) of the fluid pump.

Turning now to the drawings and initially to FIG. 1, a conventional dual-diaphragm pneumatically-shifted reciprocating fluid pump is shown generally illustrated at 10. The pump 10 includes inlet check valves 12, and outlet check valves 14, which are essentially identical and are the subject of this patent.

Fluid flow through the pump is from bottom to top, specifically in a pump inlet 16, up through the inlet check valves 12, and into the fluid pump pumped-fluid chambers 18 during each respective fluid intake stroke of the pump. During each respective fluid pressure (output) stroke of the pump, fluid passes out the pump pumped-fluid chambers 18, through the outlet check valves 14, and out a pump fluid outlet 20.

Figure 2:
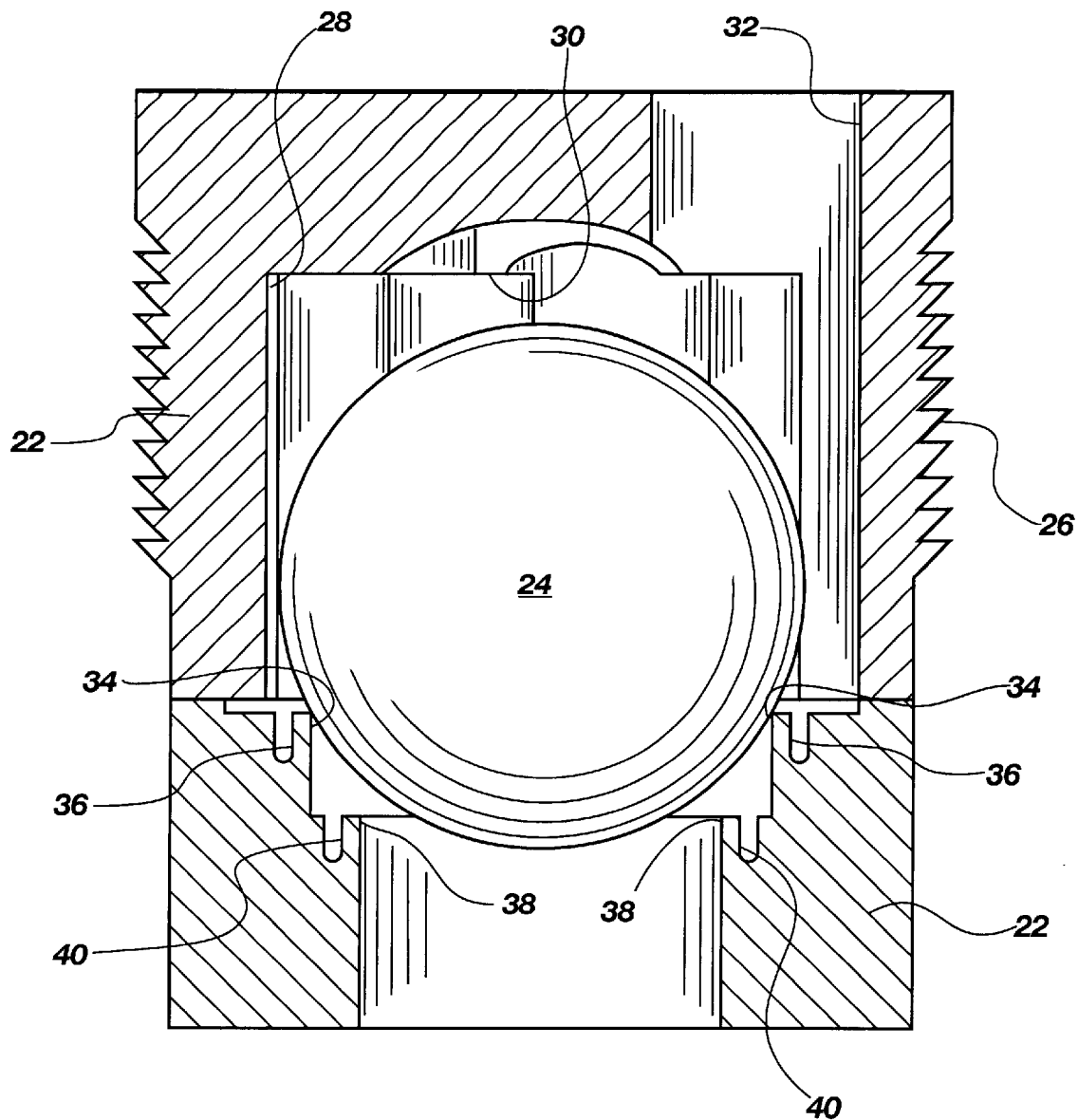
FIG. 2 is a schematic drawing of a check valve as used in the fluid pump of FIG. 1, illustrating the spherical ball valve element seating against the top (first) annular valve seat.

FIG. 2 illustrates a check valve of the present invention that can be used for either/both inlet check valve 12 and outlet check valve 14. The check valve includes a two-piece body 22 (necessary for positioning the ball valve element 24 within the body). The check valve has customary threaded connectors 26 for attaching the check valve within the fluid flow.

As is customary, the ball valve element 24 is positioned within a ball chamber 28 for limited vertical travel therein. Fluid flow is from bottom to top in the check valve. Therefore, the upper valve body 22 includes a stand-off 30 within the ball chamber 28 for preventing the ball valve element from sealing against the valve body. In this manner, fluid flow is always permitted through the check valve in the upward direction out the top. The present design also includes an offset fluid exit 32 to facilitate fluid flow through the check valve.

In practice, with no fluid flow into the bottom of the check valve, the ball valve element rests on a first annular valve seat 34 defined by a first annular groove 36, slightly outboard of the first annular valve seat 34.

Figure 3:
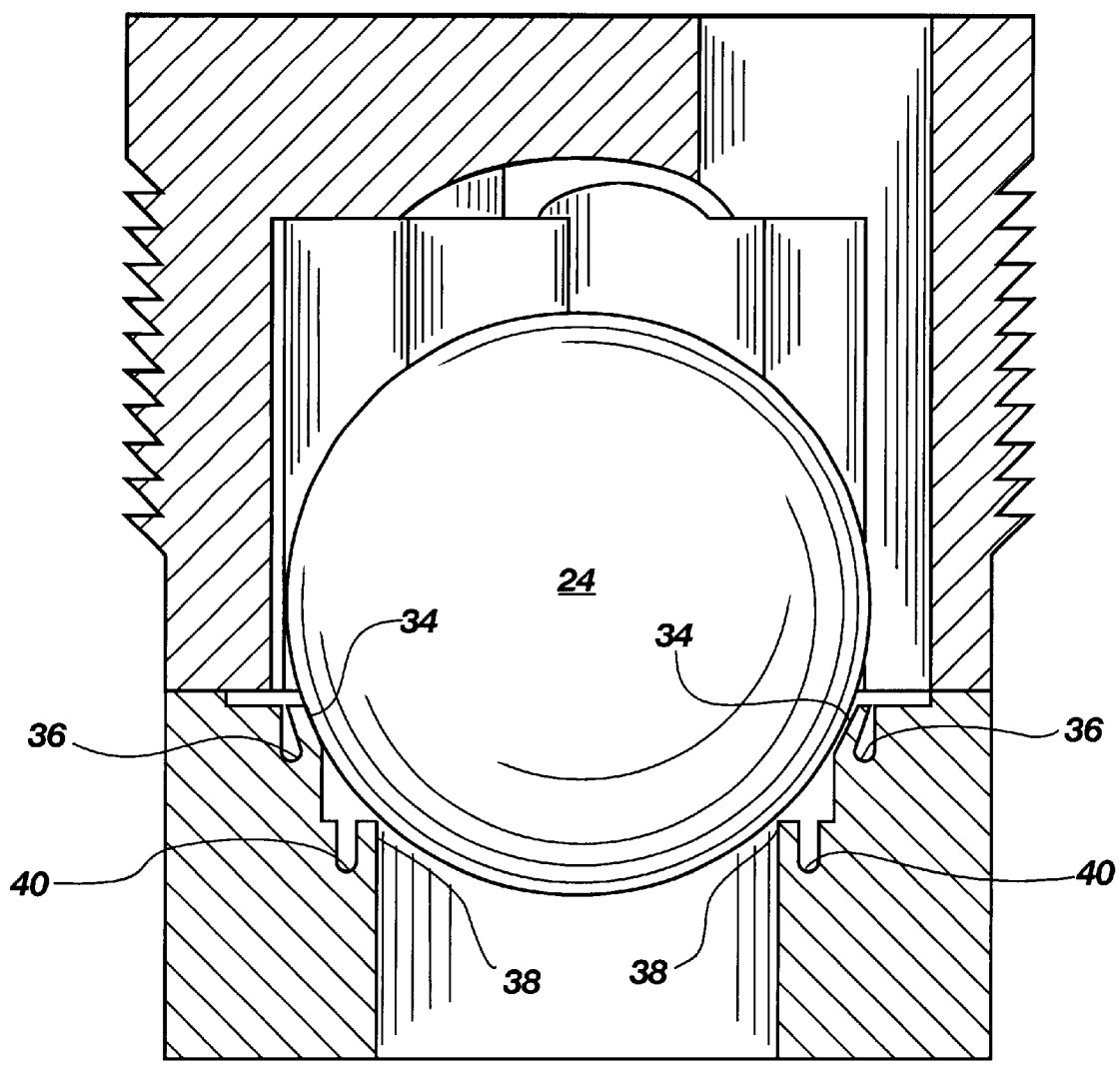
FIG. 3 is a schematic drawing of the check valve of FIG. 2, illustrating the top annular valve seat beginning to flex outwardly to effect the seal between the valve element and the seat.

The present check valve body is made of polytetrafluoroethylene (Teflon®) or similar somewhat pliable or flexible material. Therefore, the thinned-walled annular valve seat 34 can bend outwardly under the force of the ball valve element 24 under back (reverse) pressure within the check valve. This is shown in FIG. 3 wherein back pressure urges the ball valve element 24 downwardly against the first annular valve seat 34 and urges the valve seat outwardly toward and into the first annular groove 36. In this manner, the fluid seal between the ball valve element 24 and annular valve seat 36 is a circumferential surface seal, rather than a circumferential point or line seal, thus providing a more effective fluid seal within the check valve.

As abrasive slurry material is pumped through the fluid pump and through the check valve, the annular valve seat 34 defined by the cylindrical section and surrounding annular groove deteriorates, and the ball valve element 24 wears away, due to the flow of abrasive slurry therethrough, causing the annular valve seat 34 to erode away and causing the ball valve element 24 to wear down (decrease in diameter). The annular valve seat 34 slowly deteriorates, and therefore increases in diameter, and the ball valve element 24 slowly wears away, decreasing in diameter, to the point where they become no longer effective as a fluid seal.

Figure 4:
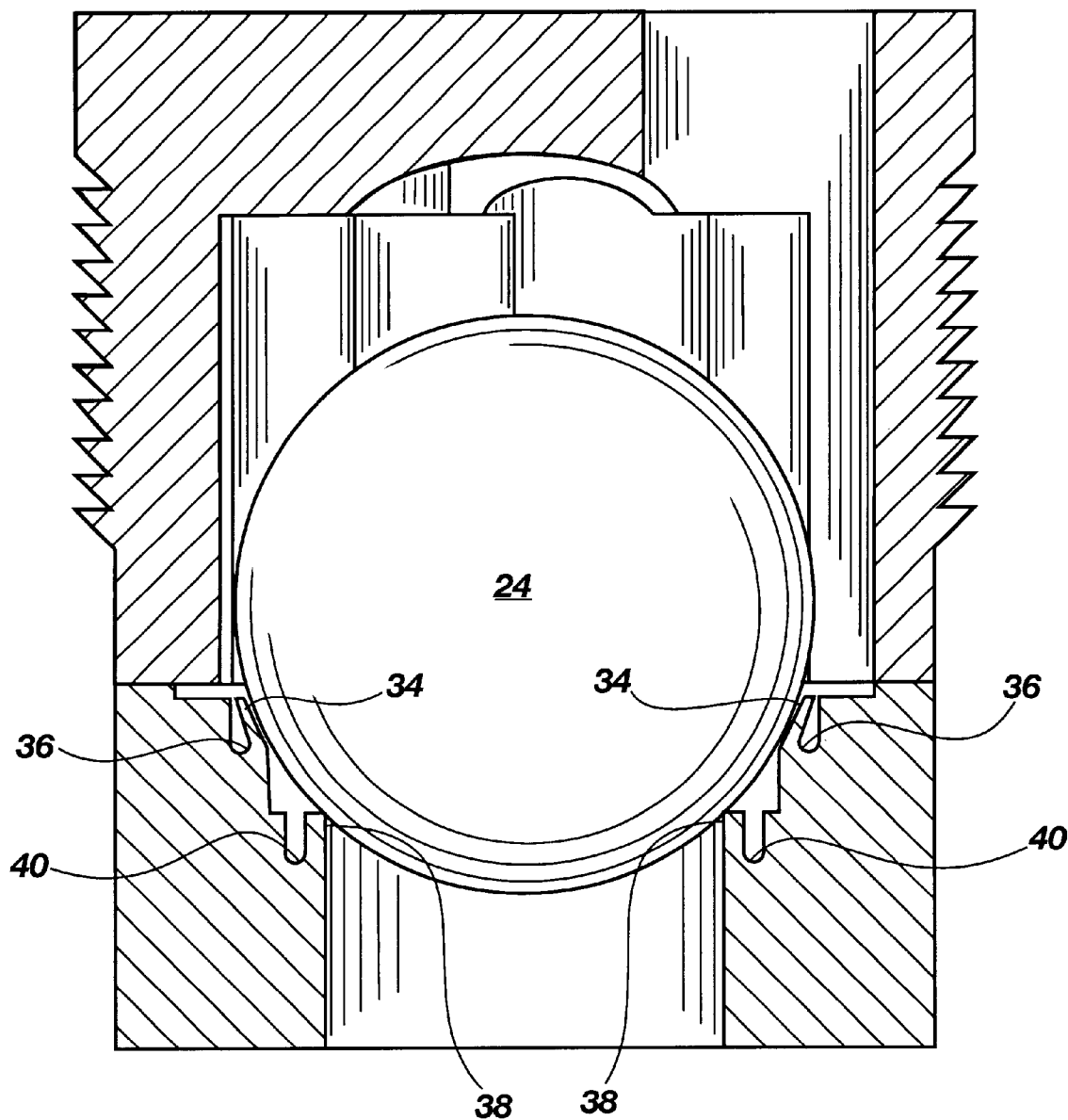
FIG. 4 is a schematic drawing of the check valve of FIG. 3, illustrating the top annular valve seat beginning to wear due to abrasive fluid pumped through the check valve.

This is shown in FIG. 4 wherein the first annular valve seat 34 has deteriorated to the point that its effectiveness is severely diminished. As the first annular valve seat 34 wears down from the flow of abrasive slurry material through the check valve, and as the ball valve element 24 wears away (also from the flow of abrasive slurry material through the check valve), the ball valve element drops to engage a second annular valve seat 38 defined by a second annular groove 40 slightly outboard of the second annular valve seat. The second annular valve seat (38) is spaced apart from the first annular valve seat (34) a distance to permit the second valve seat to seal with the ball valve element upon the occurrence of the first valve seat wearing and deforming a sufficient and pre-determined amount. This is also shown in FIG. 4.

Figure 5:
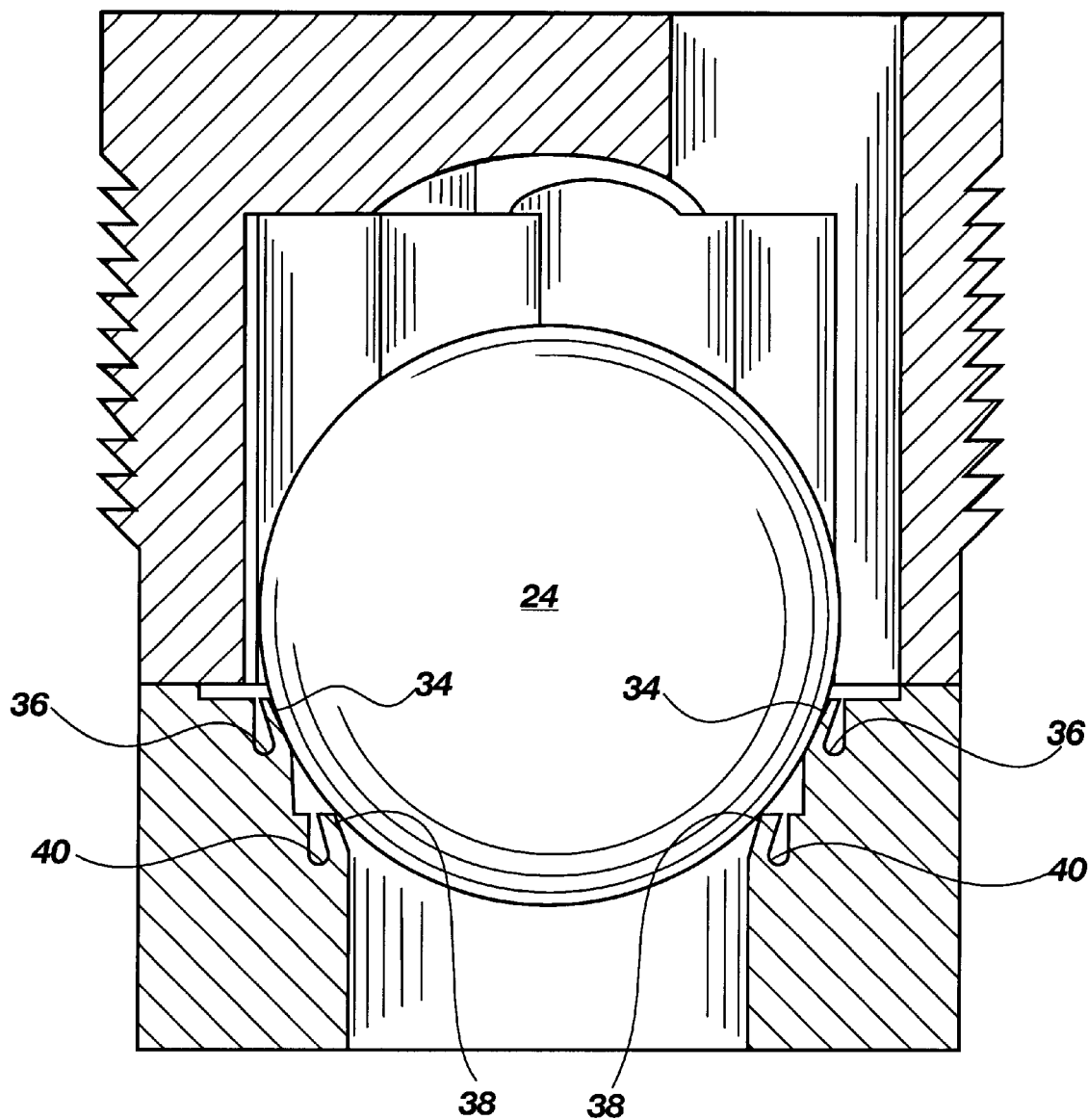
FIG. 5 is a schematic drawing of the check valve of FIG. 4, illustrating the top annular valve seat worn down to the point where the ball valve element engages the second (lower) annular valve seat and begins to flex it outwardly.

Being also made of polytetrafluoroethylene, the second annular valve seat 38 also bends outwardly under the force of the ball valve element under back (reverse) pressure within the check valve. This is shown in FIG. 5.

Figure 6:
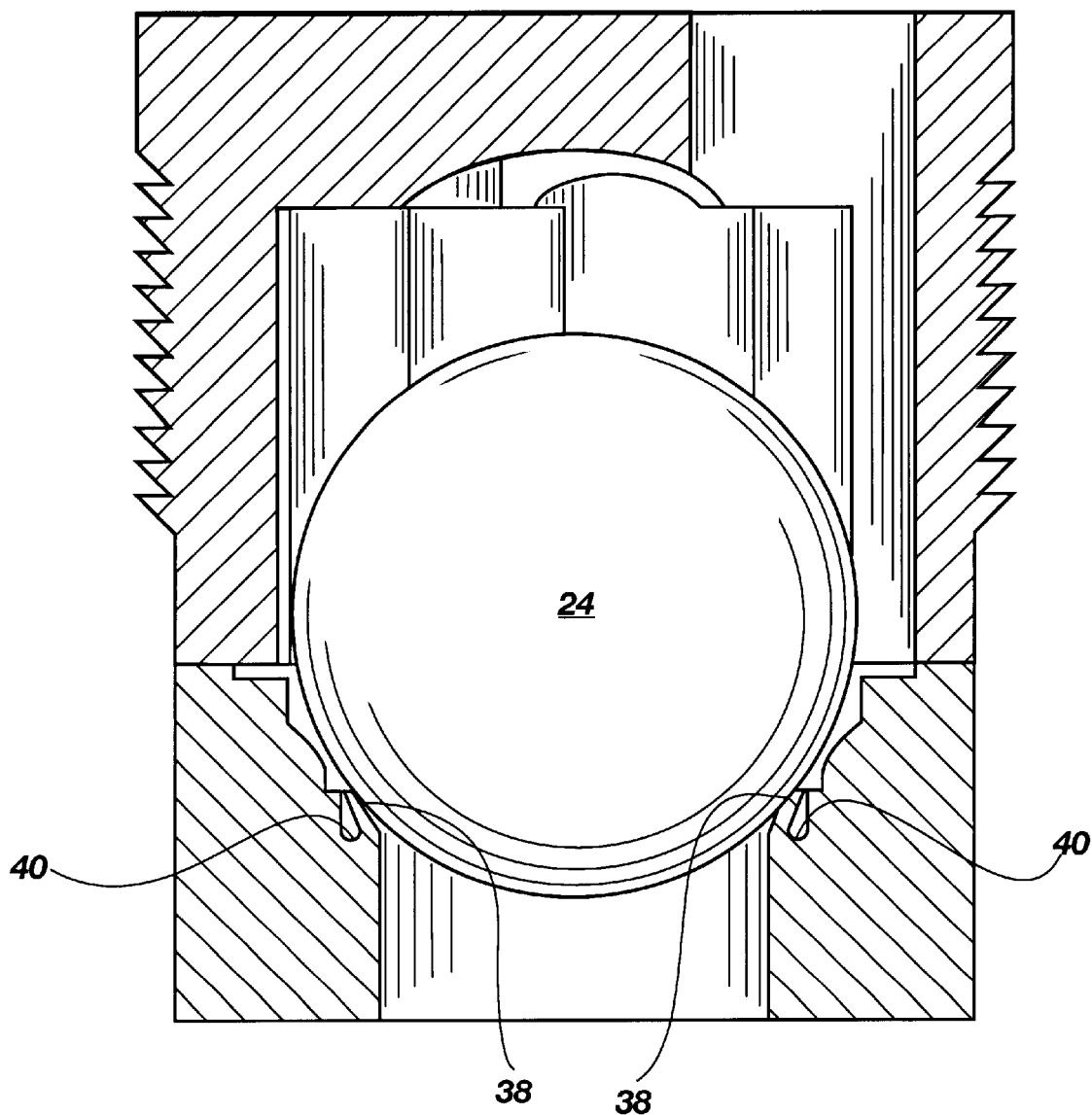
FIG. 6 is a schematic drawing of the check valve of FIG. 5, illustrating the top annular valve seat having been completely worn away so that the ball valve element seals only against the second (lower) annular valve seat.

As abrasive slurry material is pumped through the pump and check valves, and as the annular valve seats 34, 38 continue to deteriorate, the first annular valve seat 34 eventually is completely worn away. This is shown in FIG. 6 wherein the ball valve element 24 seats only on the second check valve annular seat 38. Further flow of abrasive flurry material through the check valve will eventually wear away the second annular valve seat 38, whereupon the process repeats itself with a third and possibly subsequent valves seats (not shown). Alternatively, the check valves can be easily replaced, or the bottom section of the check valve body can be replaced with a new bottom section (having a progressive series of new annular valve seats) along with a new ball valve element to renew the check valve.

A fluid pump incorporating check valves of this invention may be used both for suction and for pumping abrasive slurry. In the suction mode, the larger (first) annular valve seat 34 is preferable because of the larger cross-sectional area of the first (larger) annular valve seat. When the first (larger) annular valve seat 34 deteriorates away and fails, the second (smaller) annular valve seat 38 is then used, even though the sealing area is smaller due to the smaller diameter of the second annular valve seat. Therefore, the second, smaller annular valve seat functions, but not necessarily as effectively as the first, larger annular valve seat. The bottom (smaller) annular valve seat 38 also prevents the ball valve element 24 from distorting and actually being sucked through the upper valve seat 34 when the upper seat is worn to the point that it is no longer effective. Because the bottom valve seat is smaller, it acts as a stop to prevent the ball valve element 24 from being sucked therethrough.

For optimum suction and fluid "lift" in a suction pump, the objective is to seal around the ball valve element 24 as high up on the ball valve element as possible (i.e., as near the diameter of the ball valve element as possible). This, of course, creates the greatest suction or lifting force for a given pressure (either positive or negative) (force=pressure× area). Therefore, for suction pumps, it is imperative that, in the case of at least the fluid-in port of the pump, the fluid inlet check valve cause the ball valve element to seat and seal against the top (largest diameter) annular valve seat available.

There is a point in the operation of the check valve wherein the ball valve element is in sealing engagement with both the upper valve seat and the lower valve seat. In this instance, both annular valve seats wear, both from the abrasive action of the abrasive fluid being pumped through the check valve, and by the action of the ball valve element repeatedly "hammering" the two annular valve seats (i.e. repeated seating under the force of the fluid pressure against the valve seat, followed by unseating of the valve from the annular valve seats). In this instance, even though it would be assumed that the annular valve seats would wear evenly, in point of fact, the upper, larger annular valve seat wears more rapidly than the lower annular valve seat, due to: (1) the larger force applied to the upper, larger annular valve seat due to its larger cross-sectional sealing diameter; and (2) the angle of incidence of contact between the ball valve element and the upper valve sealing surface.

The present check valve design comprises two types of check valve annular seats in one. The first type is primarily a suction seat, wherein the first, larger annular valve seat 34 is used because of its greater sealing cross-sectional area, and therefore, its greater suction ability. For abrasive slurry-type pumps, the smaller check annular valve seat 38 is typically used because of its better wear characteristics. The present pump is equally useable for both applications (high-suction and pumping slurry) because the larger annular valve seat 34 is the initial valve seat used in all applications, and therefore functions optimally in high-suction requirement environments. When pumping abrasive slurry through the pump, the first, larger annular valve seat 34 eventually erodes away, yielding to the smaller annular valve seat 38, which is preferable for slurry-pumping applications because the second annular valve seat 38 is considerably smaller than the ball valve element 24. In the abrasive slurry environment, the small annular valve seat—large ball valve element combination will not deteriorate as quickly as the large annular valve seat—large ball valve element combination. The result is a check valve (and therefore, a fluid pump) that serves as both a high-suction application pump and as an abrasive slurry pump.

From the foregoing, it will be seen that this invention is one well adapted to attain all of the ends and objectives herein set forth, together with other advantages which are obvious and which are inherent to the apparatus. It will be understood that certain features and subcombinations are of utility and may be employed with reference to other features and subcombinations. This is contemplated by and is within the scope of the claims. As many possible embodiments may be made of the invention without departing from the scope of the claims. It is to be understood that all matter herein set forth or shown in the accompanying drawings is to be interpreted as illustrative and not in a limiting sense.

| LIST OF INDIVIDUAL ELEMENTS | |
|---|---|
| 10 | pump |
| 12 | inlet check valve |
| 14 | outlet check valve |
| 16 | pump fluid inlet |
| 18 | pump fluid chamber |
| 20 | pump fluid outlet |
| 22 | check valve two piece body |
| 24 | ball valve element |
| 26 | valve threaded connectors |
| 28 | valve body ball chamber |
| 30 | valve body ball stand off |
| 32 | offset fluid exit |
| 34 | first annular valve seat |
| 36 | first annular groove |
| 38 | second annular valve seat |
| 40 | second annular groove |

What is claimed is:

1. A check valve comprising:

a valve housing defining a ball chamber;

a ball valve element positioned for movement within the ball chamber, the valve housing having:

a first deformable valve seat formed of the same material as the valve housing for sealing against the ball valve element; and a second deformable valve seat, smaller than the first valve seat and coaxially spaced inwardly therefrom, formed of the same material as the valve housing for sealing against the ball valve element only following the deterioration of the first valve seat, wherein the valve seats are defined by respective annular valve housing sealing surfaces, each having respective annular grooves therearound to result in the valve seats being deformable outwardly into said grooves to conform to the surface of the ball valve element.

2. The check valve of claim 1 wherein the valve seats are destructible.

3. The check valve of claim 1 wherein the valve seats are made of polytetrafluoroethylene or similar material.

4. The check valve of claim 1 wherein the valve element is destructible.

5. The check valve of claim 1 wherein the valve element is made of polytetrafluoroethylene or similar material.

6. The check valve of claim 1 wherein the ball valve element has a diameter, and the first valve seat is slightly smaller than the ball valve element diameter and seats against the ball valve element adjacent the ball valve element diameter.

7. A check valve comprising:

a valve housing defining a valve element chamber;

a valve element positioned for movement within the valve element chamber, the valve housing having:

a first deformable valve seat formed of the same material as the valve housing for sealing against the valve element; and a second deformable valve seat, smaller than the first valve seat and coaxially spaced inwardly therefrom, formed of the same material as the valve housing for sealing against the valve element only following the deterioration of the first valve seat, wherein the valve seats are defined by respective annular valve housing sealing surfaces, each having respective annular grooves therearound to result in the valve seats being deformable outwardly into said grooves to conform to the surface of the ball valve element.

8. The check valve of claim 7 wherein the valve seats are destructible.

9. The check valve of claim 7 wherein the valve seats are made of polytetrafluoroethylene or similar material.

10. The check valve of claim 7 wherein the valve element is destructible.

11. The check valve of claim 7 wherein the valve element is made of polytetrafluoroethylene or similar material.

12. The check valve of claim 7 wherein the valve element has a diameter, and the first valve seat is slightly smaller than the valve element diameter and seats against the valve element adjacent the valve element diameter.

* * * * *